United States Patent Office 3,282,992
Patented Nov. 1, 1966

3,282,992
METHOD FOR THE PREPARATION OF ACETOPHENONE AND BENZOIC ACID
James P. Harris, Littleton, Colo., assignor to Marathon Oil Company, Findlay, Ohio, a corporation of Ohio
No Drawing. Filed July 2, 1964, Ser. No. 380,021
5 Claims. (Cl. 260—524)

The present invention relates to the preparation of acetophenone and benzoic acid by the oxidation of ethylbenzene with ammonium dichromate. More particularly, this invention relates to the oxidation of ethylbenzene with aqueous ammonium dichromate to produce simultaneously acetophenone and benzoic acid.

In prior oxidation processes, using Cr (VI) as an oxidant large amounts of alkali metal halides or sulphates were produced as by-products. The low value of these materials has rendered the oxidation processes commercially unfeasible. The present process avoids this undesirable result since the reduced chromium compound, $Cr_2O_3$, can be regenerated to ammonium dichromate while producing the more economically attractive ammonium salts.

It has now been found quite unexpectedly that ethylbenzene may be oxidized by aqueous ammonium dichromate to obtain high yields of acetophenone together with benzoic acid and benzamide. This result is surprising since Cr (VI) oxidations normally proceed at so fast a rate that the reaction cannot be stopped short of the production of the acid, amide, or carbon dioxide.

It has also been found that by increasing the ratio of ammonium dichromate to ethyl benzene in the reaction, increased amounts of benzoic acid may be obtained.

In accordance with the process of this invention, ethylbenzene is contacted with an aqueous solution of ammonium dichromate in a suitable reaction vessel, usually an autoclave. The reaction is carried out at elevated temperatures and at ambient pressure. The reaction media is in two phases and, after the oxidation is completed, acetophenone can be removed from the organic phase by extraction with a suitable solvent, such as hexane, or by other methods well known to those skilled in the art. The chromic oxide produced during the reaction precipitates from the reaction media and is removed, usually by filtration or by other means such as decantation.

The initial oxidation reaction mixture, i.e., the mixture of ethylbenzene and an aqueous solution of ammonium dichromate prior to reaction, is in two phases and known techniques for increasing miscibility and surface area may be used in the present process to improve contact between the aqueous and organic phases. For example, surfactants can be added to the mixture to reduce the surface tension between the two phases, and stirring or bubbling can be used to increase surface area.

The specific reaction conditions employed may vary over wide limits. The oxidation temperatures are usually in the range of from 175° C. to 275° C., with a temperature of approximately 200–250° C. being preferred. Good yields are obtained with relatively short reaction times on the order of from one-half to two hours with a reaction time of approximately one hour being preferred. The ratio of mole equivalents of ammonium dichromate to ethylbenzene which are useful in the process range from about 0.5:1 to 3.0:1.0. Ratios of from about 1:1 to 2:1 are preferred.

In a preferred cyclic process, the $Cr_2O_3$ formed as a by-product of the oxidation is regenerated to form ammonium dichromate. The $Cr_2O_3$ is introduced into a reaction vessel containing aqueous ammonia and is then contacted with an oxygen containing gas, such as oxygen, air, oxygen enriched air, oxygen-nitrogen mixtures, and the like. The reaction mixture is then heated to a temperature in the range of from about 140° to 225° C. and preferably about 180° C. The regeneration reaction is enhanced by conducting it in the presence of catalysts such as cobalt naphthanate or cupric sulphate. In a preferred embodiment, the $Cr_2O_3$ is regenerated in the presence of a mixture of cupric sulphate and sodium sulphate. When this catalytic mixture is employed, about 90% of the $Cr_2O_3$ is converted to ammonium chromate after about from fifteen to sixty minutes of reaction time.

The reaction vessel is then vented to flash ammonia and steam from the reaction mixture. The removal of the ammonia converts the ammonium chromate to ammonium dichromate, which is used to oxidize further amounts of ethylbenzene, and reduces the pH of the reaction mixture, thereby precipitating copper ions as the insoluble hydroxide. The ammonia which can be flashed off is recycled to the chromic oxide regeneration vessel.

Generally, the ammonia solution used for regeneration contains from about 4% to about 80% by weight ammonia and preferably from about 7% to about 15%. The equivalent ratio of ammonia to chromic oxide in the reaction zone should be from about 2 to 16. Oxygen partial pressures in the regeneration vessel should be on the order of about 20 to 500 p.s.i., with approximately 200 p.s.i. being preferred.

Thus, it is apparent that when the cyclic process is employed, including the step of regenerating the oxidizing agent, a highly efficient method of manufacturing acetophenone is provided.

Having thus described the invention in general, it is believed that the following detailed examples illustrating certain preferred procedures will assist towards a fuller appreciation of the invention.

*Example I*

A 300 ml. rocking autoclave is charged with 50.7 grams (0.21 mole) ammonium dichromate, 154 ml. of water, and 24.5 ml. (0.200 mole) ethylbenzene. The pH of the mixture of starting materials is 3.65. The autoclave is then heated to 225° C., with constant rocking, and is held at this temperature for sixty minutes. Following this, the autoclave is cooled by immersion in water. The autoclave contains an aqueous phase, and an organic phase, and a solid phase ($Cr_2O_3$) reaction mixture. The organic phase is extracted with hexane and it is determined that a 31.5% yield of acetophenone is obtained. Minor amounts of benzoic acid and benzamide are also produced.

*Example II*

A 300 ml. autoclave is charged with 50.7 grams (0.201 mole) ammonium dichromate, 154 ml. water, and 12.25 ml. (0.100 mole) ethylbenzene. The initial pH of the system is about 3.65. The reaction mixture is heated to 225° C. with constant rocking. After heating in this manner for sixty minutes, the autoclave is cooled by immersion in water. The pH of the system after reaction is about 9.35. The organic phase is extracted with hexane and it is determined that a 14.75% yield of acetophenone was obtained. The aqueous phase is acidified with concentrated sulphuric acid and it is found that a 38.75% yield of benzoic acid is also obtained.

Thus, by decreasing the equivalent ratio of ethylbenzene to ammonium dichromate, from the 1 to 1 ratio used in Example I, the production of acetophenone is suppressed and the yield of benzoic acid is increased.

The fundamental features of the invention have been described as applied to the preferred embodiment. It is

What is claimed is:

1. A method for oxidizing ethylbenzene to produce acetophenone and benzoic acid comprising:
reacting ethylbenzene with an aqueous solution of ammonium dichromate at a temperature of from 175° to 275° C.

2. The method for oxidizing ethylbenzene to produce acetophenone and benzoic acid comprising:
mixing ethylbenzene with an aqueous solution of ammonium dichromate,
heating the reactants at a temperature in the range of from 175° to 275° C. to produce acetophenone and benzoic acid and to reduce the ammonium dichromate to chromic oxide,
catalytically reacting said chromic oxide with oxygen in aqueous ammonia to produce aqueous ammonium chromate,
removing ammonia from said aqueous ammonium chromate to form aqueous ammonium dichromate, and
recycling said aqueous ammonium dichromate for reaction with additional ethylbenzene.

3. The method of claim 2 further comprising recovering ammonia generated during the process and recycling it as aqueous ammonia for reaction with said chromic oxide and oxygen to produce ammonium dichromate.

4. The method of claim 2 wherein said chromic oxide, oxygen and aqueous ammonia are reacted in the presence of a catalyst selected from the group consisting of cupric sulphate and cobalt naphthanate.

5. The method of claim 2 wherein said chromic oxide, oxygen and aqueous ammonia are reacted in the presence of a cupric sulphate catalyst and sodium sulphate.

References Cited by the Examiner

UNITED STATES PATENTS

| | | | |
|---|---|---|---|
| 2,120,672 | 6/1938 | Mares | 260—524 |
| 2,794,813 | 6/1957 | Farinacci | 260—592 |

R. K. JACKSON, *Primary Examiner.*

LORRAINE A. WEINBERGER, *Examiner.*

S. B. WILLIAMS, *Assistant Examiner.*